United States Patent [19]

Dulong

[11] Patent Number: 5,384,722
[45] Date of Patent: Jan. 24, 1995

[54] APPARATUS AND METHOD FOR DETERMINING THE MANHATTAN DISTANCE BETWEEN TWO POINTS

[75] Inventor: Carol Dulong, Saratoga, Calif.
[73] Assignee: Intel Corporation, Santa Clara, Calif.
[21] Appl. No.: 28,823
[22] Filed: Mar. 10, 1993
[51] Int. Cl.⁶ .................................. G06F 7/38
[52] U.S. Cl. ................................ 364/715.01
[58] Field of Search .................. 364/715.01

[56] References Cited

U.S. PATENT DOCUMENTS

| | | | |
|---|---|---|---|
| 4,373,191 | 2/1983 | Fette et al. | 364/715.01 |
| 4,849,921 | 7/1989 | Yasumoto et al. | 364/715.01 |
| 4,953,115 | 8/1990 | Kanoh | 364/715.01 |
| 4,982,352 | 1/1991 | Taylor et al. | 364/715.01 |
| 5,148,386 | 9/1992 | Hori | 364/715.01 |

*Primary Examiner*—David H. Malzahn
*Attorney, Agent, or Firm*—Blakely, Sokoloff Taylor & Zafman

[57] ABSTRACT

An apparatus and method for generating the absolute value of a difference. The apparatus and method include mechanisms to subtract a first operand from a second operand to generate a first difference and to subtract the second operand from the first operand to generate a second difference. The present invention also includes an apparatus and method for selecting either the first difference or the second difference depending on which is positive. In this manner, the absolute value of the difference between the first operand and the second operand is generated.

12 Claims, 9 Drawing Sheets

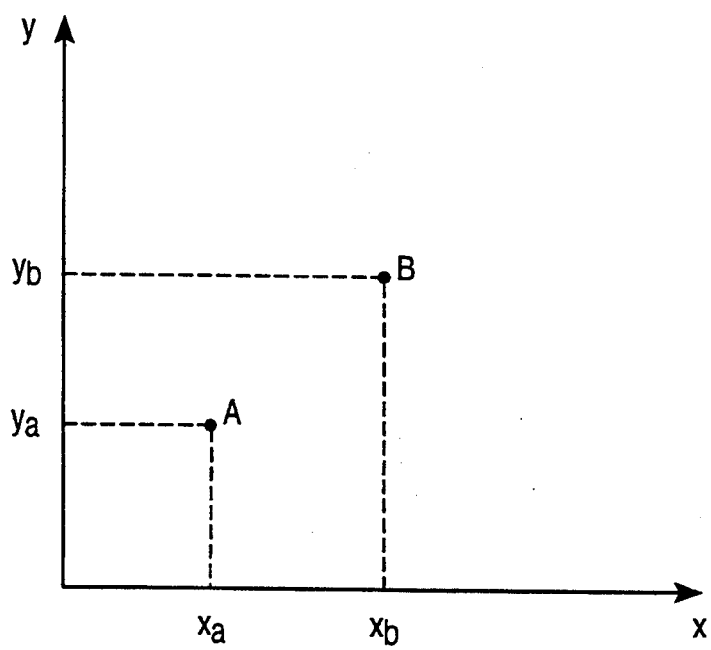
FIG_1A
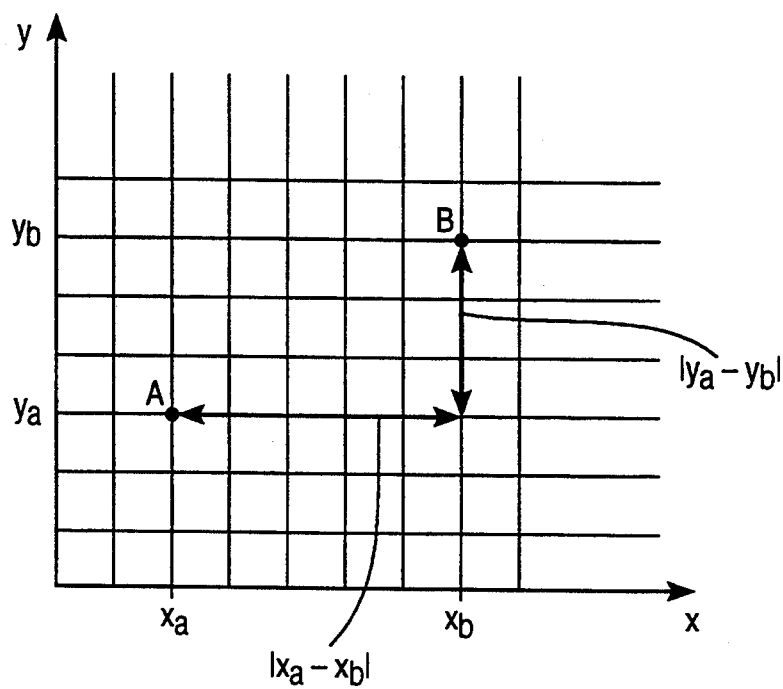
FIG_1B

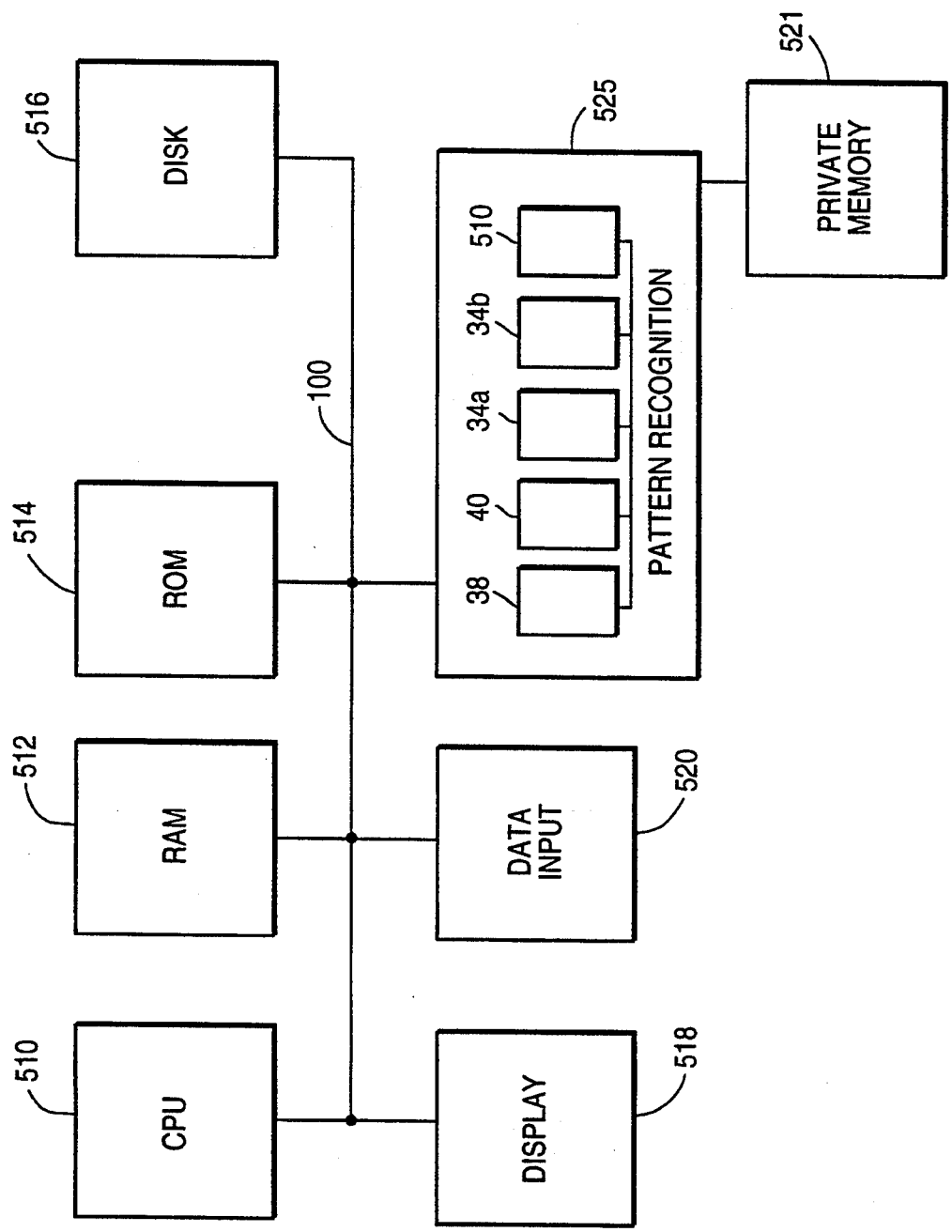
FIG_2

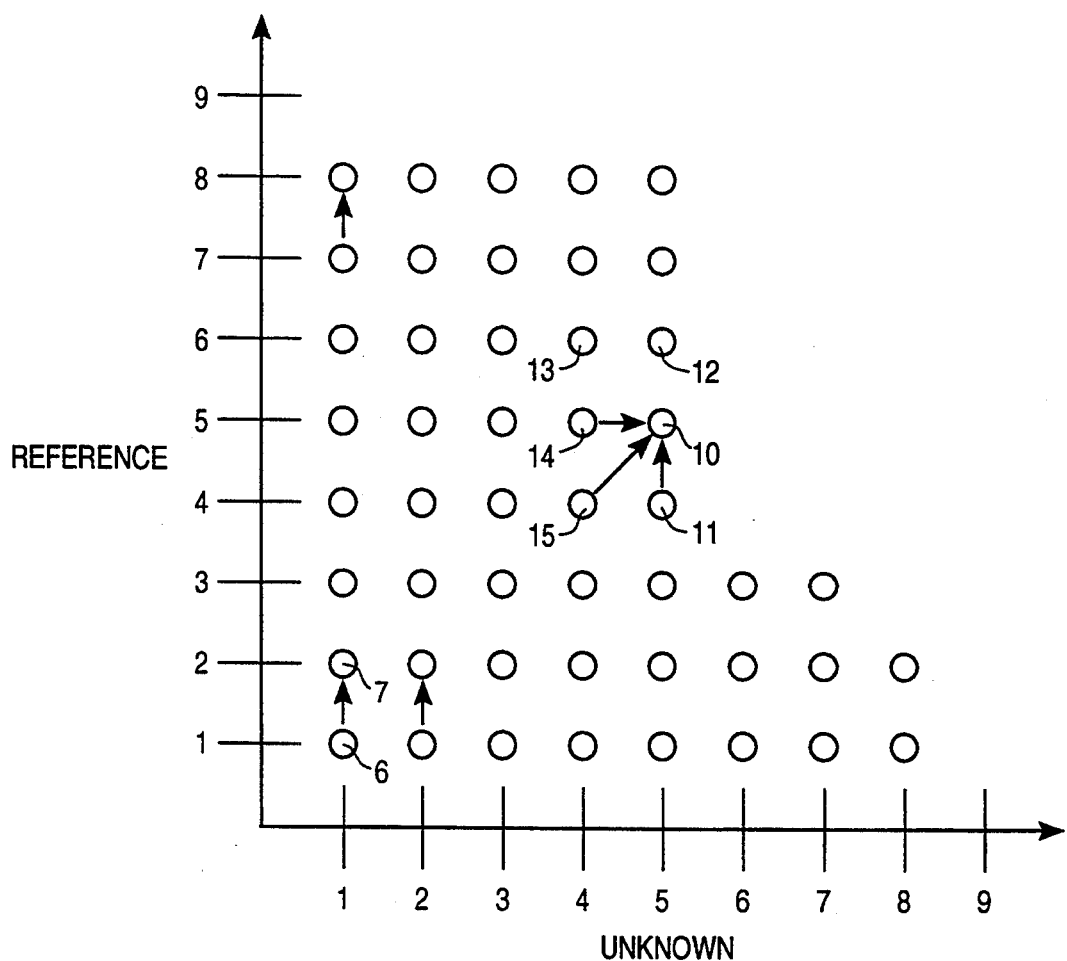
FIG_3

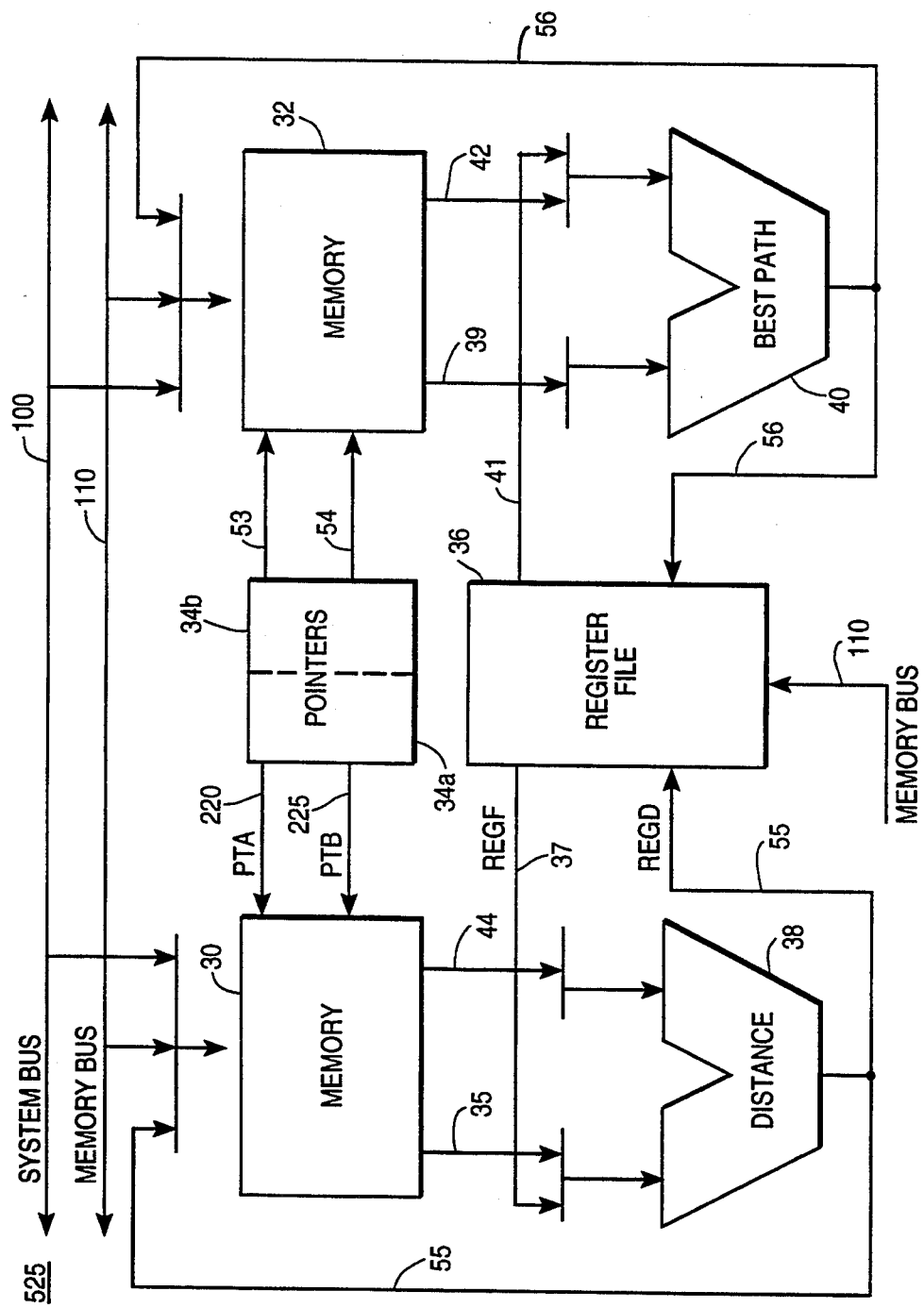
FIG_4

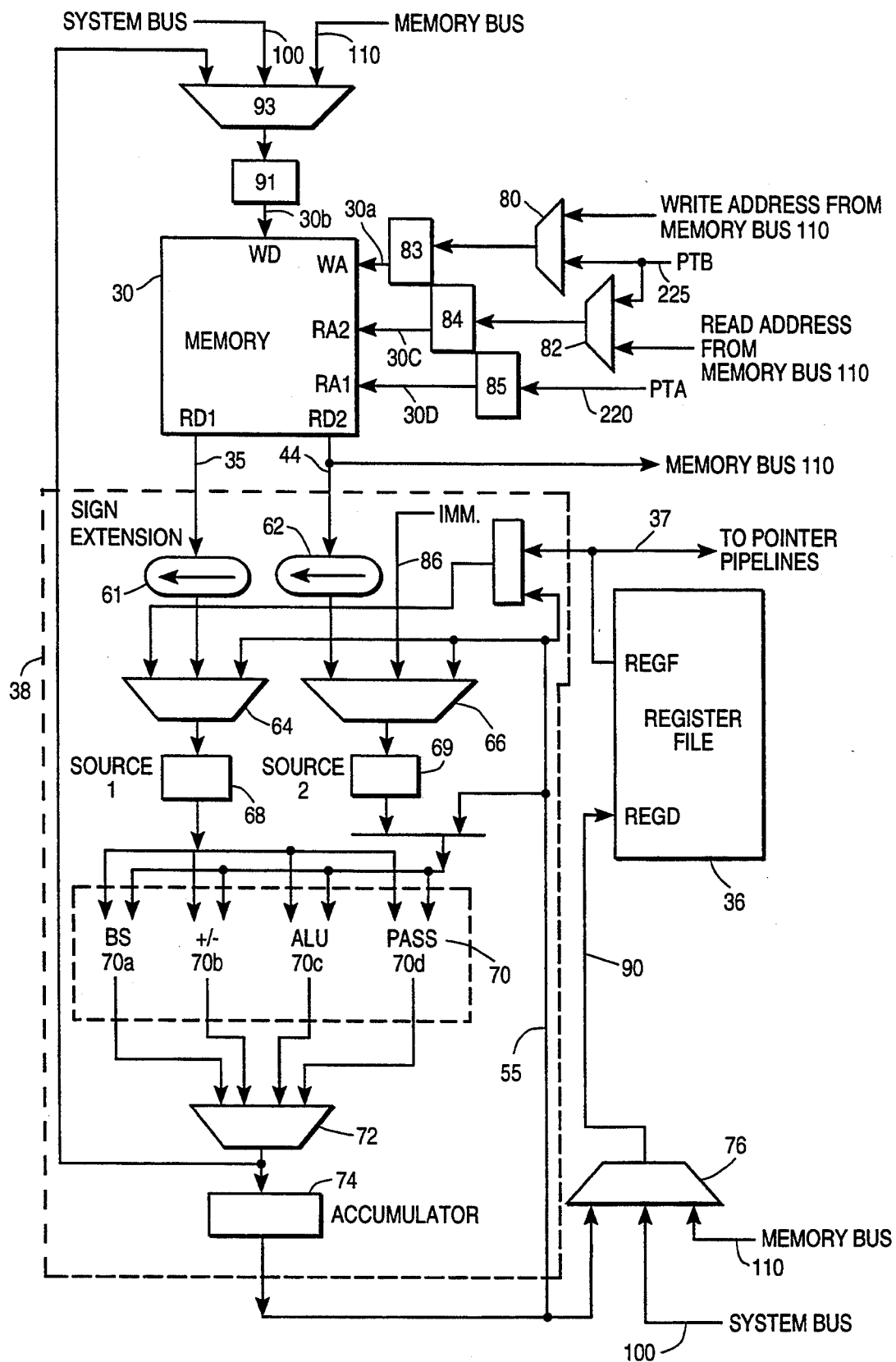
FIG_5

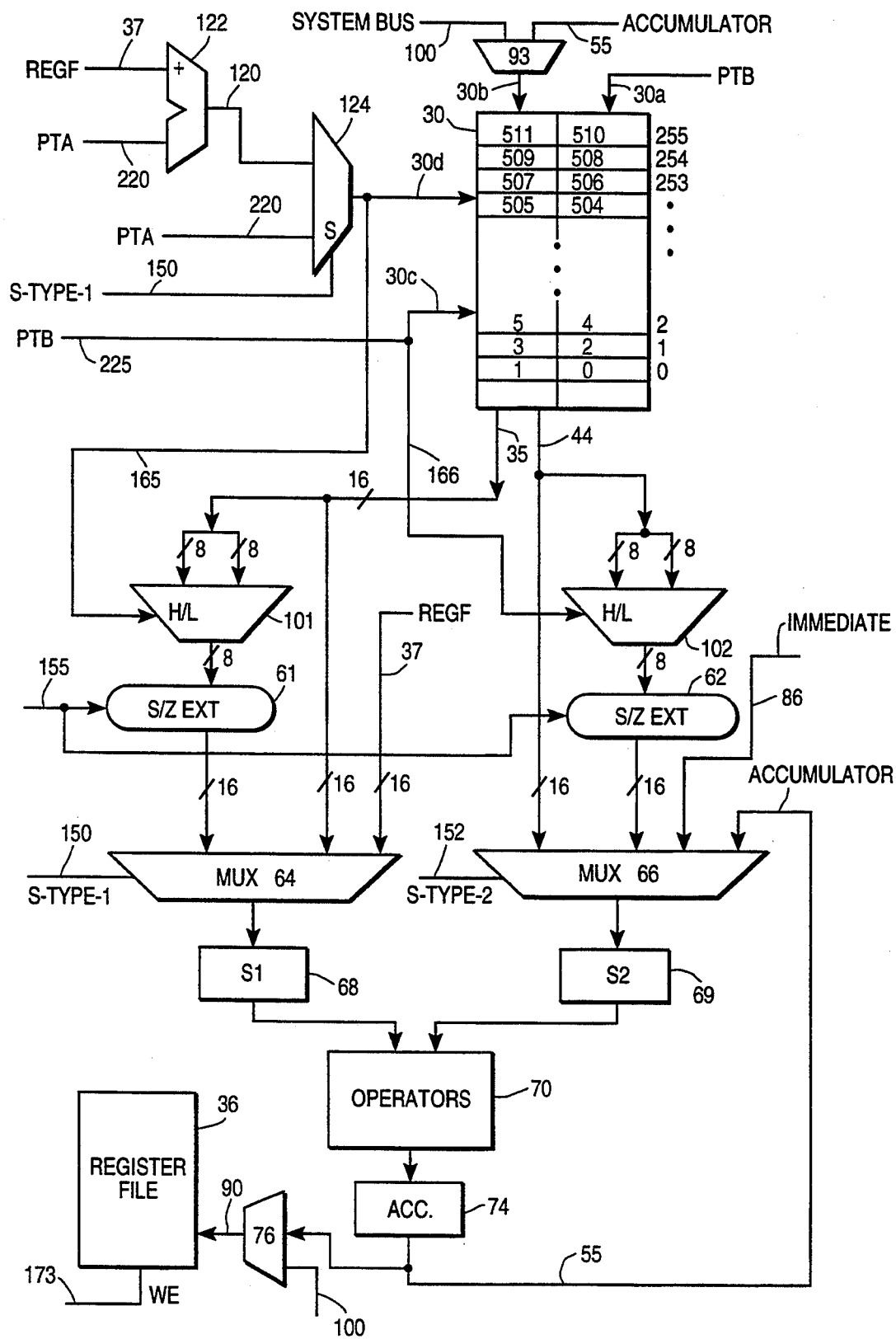
FIG_6

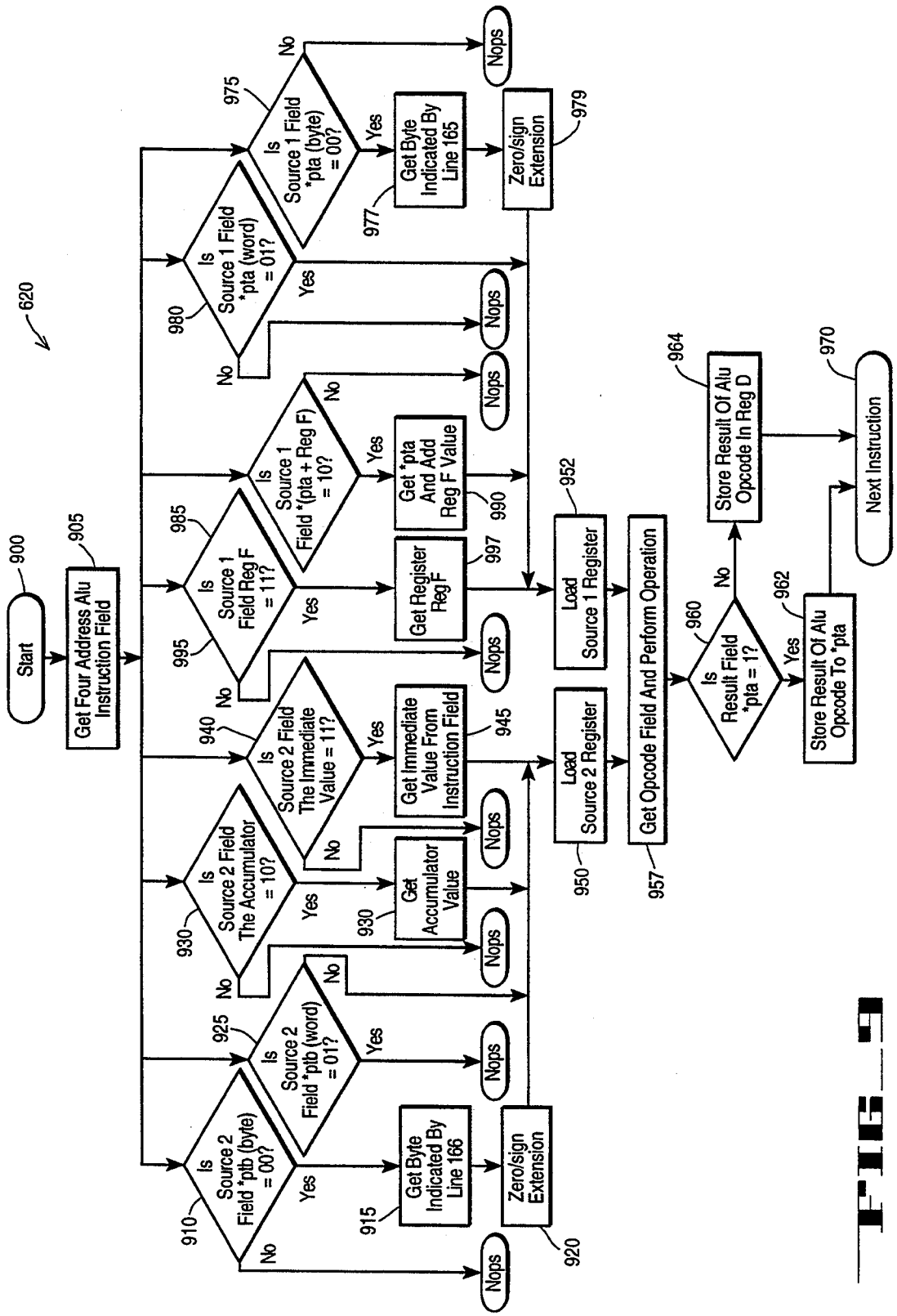
FIG_9

APPARATUS AND METHOD FOR DETERMINING THE MANHATTAN DISTANCE BETWEEN TWO POINTS

FIELD OF THE INVENTION

The present invention relates to the field of computation and logic units. Specifically, the present invention relates to the field of distance measures for determining the distance between two points.

BACKGROUND OF THE INVENTION

The calculation of the distance between two points is a common operation performed today. One application of this basic distance measure is in recognition routines and algorithms where a distance measure is used to quantify the difference between an unknown and a reference pattern, such that a determination can be made as to the identity of the unknown.

One widely known distance measure is the Euclidean distance measure. The Euclidean distance measure is the straight line distance between two points and is illustrated in conjunction with FIG. 1A. Referring to FIG. 1A, a plot of two points A and B is shown on an X-Y axis. Point A has coordinates of $(x_a, y_a)$ and point B has coordinate of $(x_b, Y_b)$. The Euclidean distance (Ed) between point A and point B is determined according to the equation:

$$Ed = \sqrt{(x_a - x_b)^2 + (y_a - y_b)^2}$$

Another distance measure is referred to as the Manhattan distance measure, or the "city block distance." The Manhattan distance is the distance between two points as measured by a path comprised of horizontal and vertical perpendicular paths and is illustrated in conjunction with FIG. 1B. Referring to FIG. 1B, a grid plot is shown having perpendicular horizontal and vertical lines. Point A is shown on the grid plot with coordinates $(x_a, y_a)$, and point B is shown on the grid plot with coordinates $(x_b, Y_b)$. The Manhattan distance (Md) between point A and point B is determined according to the equation:

$$Md = |x_a - x_b| + |y_a - y_b|$$

Today, in various fields and applications that require that these distance measures be calculated very quickly and for large numbers of points, computers are often employed. In order to calculate the Manhattan distance, these computers must determine the absolute value of a difference. In other words, a set of instructions must be used which can calculate the absolute value of a difference.

Where the instruction set includes an absolute value instruction, the calculation of the absolute value of the difference required a first instruction to calculate the difference between the two numbers (e.g., operands) and then a second instruction to produce the absolute value of that quantity. An example of such a set of instruction for determining the absolute value of the difference, x, is shown below:

temp = a − b x = abs (temp)

When the instruction set does not include an absolute value instruction, the calculation of the absolute value of the difference includes a first instruction to calculate the difference. The difference result that is produced is compared with zero. A branch instruction is then required which branches if the difference is positive. If the result is not positive, the negative of the result is taken. Upon taking the branch, the program jumps to the instruction code which immediately follows the negative instruction. An example of such a set of instructions is shown below:

```
         temp = a − b
         cmp zero
         branch positive → nxt
         -temp
nxt:     remainder of code
```

It is desirable to have one instruction for generating the absolute value of a difference.

Note that the two examples of instruction code given above also suffer from the time required to produce their results. That is, each of the cases illustrated above require numerous machine, or clock, cycles to complete performance, particularly in the case when the programming language does not have an absolute value instruction. In that case, the use of compare and branch instructions requires a large number of cycles for their completion. It is desirable to have an instruction which generates the absolute value of a difference in one clock cycle.

The present invention provides a method and apparatus for generating the absolute value of a difference. The present invention generates the absolute value of a difference in one clock cycle. By generating the absolute value of a difference in less clock cycles than the prior art, the application utilizing the calculation is able to perform its designated function more quickly.

SUMMARY OF THE INVENTION

An apparatus and method for generating the absolute value of a difference is described. The present invention includes an apparatus and method for providing a first operand specified within an arithmetic instruction. The present invention also includes an apparatus and method for providing a second operand specified within the arithmetic instruction. The present invention also includes an apparatus and method for subtracting the first operand from the second operand to generate a first result and a method and apparatus for subtracting the second operand from the first operand to generate a second result. In the currently preferred embodiment, the two subtraction operations overlap in time. The present invention also includes an apparatus and method for selecting either the first result or the second result, whichever is positive, such that the absolute value of the difference between the first operand and the second operand is produced in one clock cycle.

BRIEF DESCRIPTION OF THE DRAWINGS

The present invention will be understood more fully from the detailed description given below and from the accompanying drawings of the preferred embodiments of the invention, which, however, should not be taken to limit the invention to the specific embodiments, but are for explanation and understanding only.

FIGS. 1A and 1B illustrate prior art measures for determining the distance between two points.

FIG. 2 is a block diagram of the overall system in which embodiments of the present invention may advantageously operate.

FIG. 3 is an illustration of a Dynamic Time Warping pattern recognition lattice and individual points comparing a known pattern against an unknown pattern.

FIG. 4 is a block diagram illustrating the two pointer pipelines, the two arithmetic pipelines, the memories and register files of one embodiment of the present invention.

FIG. 5 illustrates a detailed block diagram of the distance arithmetic pipeline (identical to the best path pipeline), associated memory 30 and the register file of the present invention.

FIG. 6 illustrates a detailed block diagram of the distance arithmetic pipeline and illustrates the circuitry required to process the four addresses of the arithmetic instruction of the present invention.

FIG. 9 illustrates a detailed flow diagram of one of the arithmetic pipelines of the present invention.

DETAILED DESCRIPTION OF THE INVENTION

Figure 7:
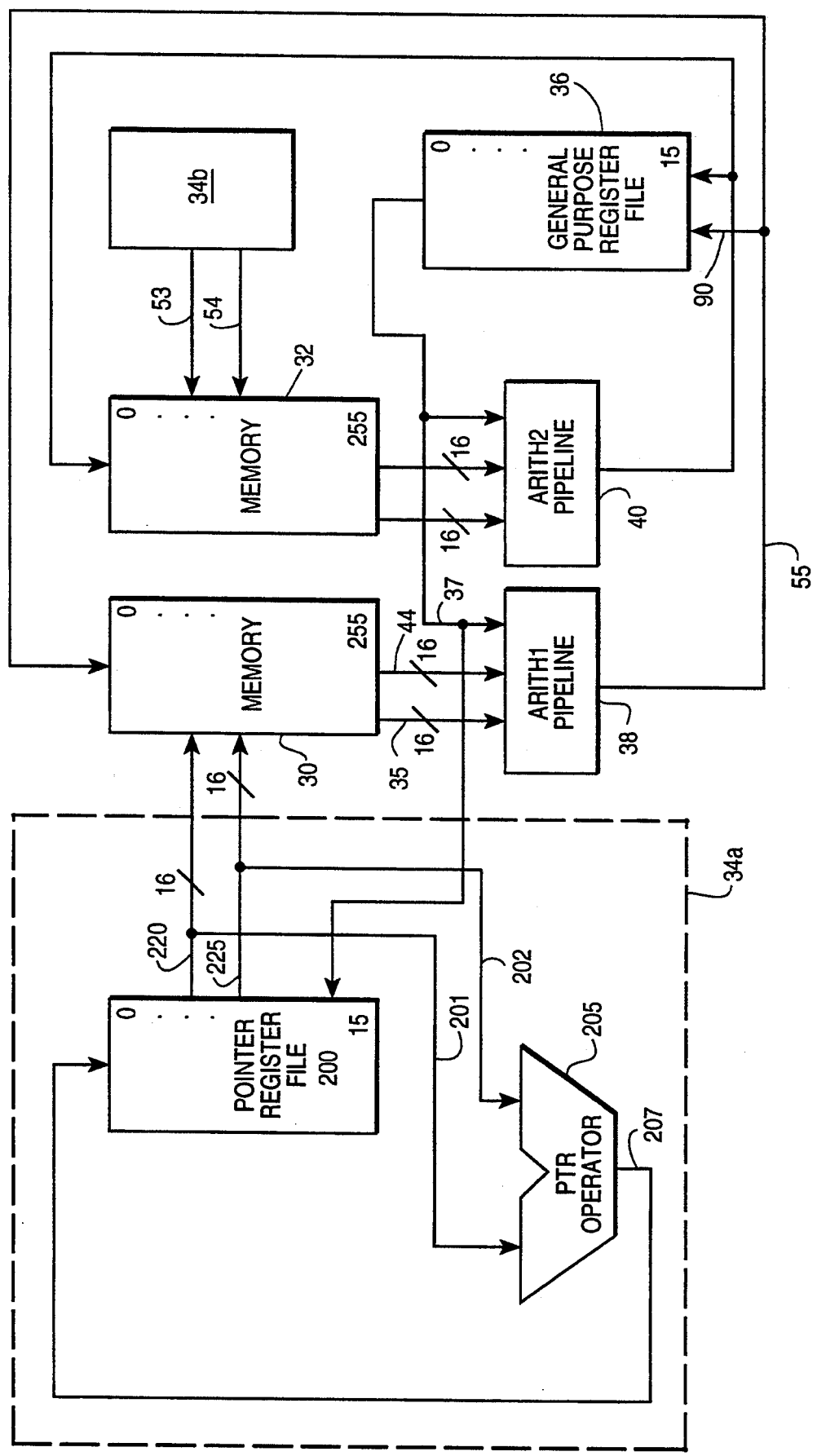
FIG. 7 illustrates a block diagram of the present invention illustrating the configuration of the pointer pipelines and the arithmetic pipelines of the present invention.

The present invention provides a method and apparatus for determining the absolute value of the difference between two numbers. In the currently preferred embodiment, the absolute value of the difference between two 16 bit numbers is determined. In the present invention, this calculation is performed in order to calculate the Manhattan distance between two points. In the present invention, the absolute value of the difference is determined in response to the execution of an instruction. The instruction is implemented using two subtract operators, where one operator subtracts a first operand from a second operand and the second operator subtracts the second operand from the first operand. The result of the two subtractions that is positive is selected. In one embodiment, the execution of the instruction that determines the absolute value of the difference is performed in one machine cycle.

In the following detailed description of the present invention numerous specific details are set forth in order to provide a thorough understanding of the present invention. However, it will be obvious to one skilled in the art that the present invention may be practiced without these specific details. In other instances well known methods, functions, components and procedures have not been described in detail as not to unnecessarily obscure the present invention.

An embodiment of the present invention may be advantageously utilized within a standard computer system having a common system bus 100. One such typical computer system having a system bus 100 utilizes the well known 5 volt ISA computer bus format. Therefore, reference to a system bus 100 throughout this present discussion may be interpreted as utilizing the ISA standard computer system bus. Referring to FIG. 2, the elements of the preferred embodiment of the present invention reside within a pattern recognition system 525 capable of executing sections of program code shared with the CPU 510 that compare reference patterns against an unknown pattern to locate candidate patterns for match. The overall computer system contains a Central Processing Unit 510 coupled to the bus 100. The system includes Random Access Memories 512 and Read Only Memories 514 for storage of data and program code; these are coupled to the bus 100. An optical or magnetic disk drive or other storage device 516 is coupled to the bus 100 for storage of data and/or program code. A display means 518 is coupled to the bus 100 for display of data for visualization by a computer user. The display may be a standard CRT device, liquid crystal or otherwise containing an analog or digital driven signal. A data input device 520 is coupled to the bus 100 and includes a means for inputting data into the system such as a keyboard, tablet, stylus with associated digitizer, or other pattern data input device. The pattern recognition system (Pattern Engine) 525 is composed of two arithmetic pipelines 38 and 40 as well as two pointer pipelines 34a and 34b as well as on chip memory units, register files and other associated hardware 510 that will be described in greater detail to follow. A private memory 521 (separate from RAM 512) is also associated with the pattern engine 525 for containing reference pattern information and functions as a prototype library.

Dynamic Time Warping Pattern Recognition Procedure

As discussed above, the present invention may be particularly used within the field of pattern recognition of computer systems. One well known procedure utilized by pattern recognition computer systems is described. This procedure is commonly referred to as Dynamic Time Warping (DTW). The present invention is optimized to operate within this procedure in order to render pattern recognition. Therefore, the following is a discussion of some of the processing steps required for the DTW procedure used for pattern recognition. It is appreciated that a full understanding of the DTW procedure is not a requirement to understanding the elements of the present invention. In so far as the elements of the DTW procedure have driven the design of the present invention, these elements are discussed herein. It is noted that for additional background information regarding the well known DTW procedure used in voice and handwriting recognition, refer to: T. Parsons author of "Voice and Speech Processing," published by McGraw-Hill in 1987; "On line Handwriting Recognition—A Survey," by C. C. Tappert, C. Y. Suen, and T. Wakahara, IEEE, 1988; and C. C. Tappert, "Cursive Script Recognition by Elastic Matching," IBM J. Res. Develop. Vol. 26, No. 6, Nov. 1982.

Regarding FIG. 3, there is illustrated a graphical representation of the two axes used in the Dynamic Time Warping (DTW) procedure used for pattern recognition. According to the DTW procedure, there are several reference patterns that are known and are placed into a reference library. One goal of the DTW procedure is to compare an unknown (input) pattern against the reference patterns of the library in order to locate a match between the unknown and the reference patterns. FIG. 3 graphically illustrates the DTW procedure applied to one reference pattern against the unknown pattern. It is appreciated that the DTW procedure operates, as will be described herein, for each reference pattern in the library against the unknown pattern. Along the vertical axis are plotted points (from 1 to 9) that comprise a reference pattern that is stored in the reference library within a memory unit of computer system. Along the horizontal are is plotted points (from 1 to 9) that comprise an unknown pattern that is compared by the computer processing system against the reference pattern. As each point of the unknown pattern is compared against each point of the reference pattern, a lattice or array of points is generated within the two axes.

As each point is compared, a cost function is generated across the lattice that runs from left to right across the lattice. A goal of the DTW procedure is to locate the lowest cost path across the lattice for each reference pattern and compare the paths of each of the reference patterns in order to locate the best matched pattern to the unknown. Each point of the pattern has a given number of features. A classical feature of a point includes the spatial (x, y) coordinates of that point. DTW allows the computer system to locate the best way of distorting the unknown pattern to match the reference pattern at a minimum cost. The cost is called the distance between the unknown pattern and the reference pattern. The reference pattern for which the distance to the unknown is the lowest is the best candidate for a pattern match. The DTW procedure computes the lattice of points using well known Dynamic Programming techniques.

At each point of the lattice, two independent computations need be performed by the present invention. First, a local distance (d), must be computed between the associated point of the unknown pattern and the reference pattern point. Secondly, the best path to get to the current point from the "neighbor" points must be determined. The two computations are performed in repetition during the DTW procedure. The independence of these two computations is the basic property used by the present invention to accelerate the DTW procedure. For example, the DTW procedure begins at the lower left side of the lattice (at point 6) and calculates upward along the first lattice line until the end point is reached. Within the first vertical lattice line, the first point of the unknown pattern is compared against all of the points of the reference pattern. At the end of the first lattice line the DTW procedure then starts at the second vertical lattice line and compares each of the reference pattern points against the second point of the unknown pattern and so forth down the lattice line. For instance, at point 10, the spatial feature of the fifth point of the unknown is compared against the fifth point of the reference pattern. Basically the (x, y) values associated with each of the points are processed using a distance function in a distance computation. Next, the DTW procedure examines the cost function associated with each neighbor point to point 10, these would be points 11, 15, and 14 which are some of the possible allowable neighbors in this example of DTW processing. The neighbor with the lowest cost function is then selected, say point 14, and this value is then added to the distance value for point 10. The path of the lowest cost then includes the link from point 14 to point 10. As the lattice grows from left to right the lowest cost path will be generated. The operation used in the DTW procedure to determine the best neighbor point is called, in this discussion, the path function.

As can been seen from this discussion a distance computation and a path computation are required for each point of the lattice for DTW processing. Each point of the unknown is compared against each point of the reference pattern generating a multitude of computations.

In the present invention, the distance computation is the computation of the Manhattan distance. In other words, the Manhattan distance is calculated between each point and its neighboring points. In the present invention, the Manhattan distance may be calculated between each point and its neighboring points for every feature that represents the points. In the currently preferred embodiment, each handwritten letter comprised of a set of points is compared to reference letters comprised of a set of points. The proximity between the two determines which reference character most correctly resembles the unknown input characters. The determination of this proximity is made by calculating the Manhattan distance between points in each of the characters. In the present invention, the features used to represent a point can be characterized (or quantized) spatially. These features can include, but are not limited to the position of a pen or the movement of a pen in a pen-based system.

Note that the present invention is not limited to computer systems employing Dynamic Time Warping. Other types of algorithms and recognition routines which utilize some type of distance measures are capable of employing the present invention.

Overall System of the Present Invention

With reference to FIG. 4, an overall logical system diagram of the present invention, arithmetic pipelines and pointer pipelines, are illustrated within the environment of the pattern recognition engine 525. The details of the components illustrated in the system diagram will be further described in discussions to follow. There are two identical arithmetic pipelines 38, 40 and two identical pointer pipelines 34a and 34b illustrated. According to the present invention, two data memory units 30 and 32 are utilized. These memory units contain the immediate pattern data of the unknown pattern and reference pattern that will be processed, point by point, by the present invention as well as other lattice information for each processing point within the DTW procedure. In the currently preferred embodiment, memory units 30 and 32 are RAM units and contain 256 entries by 16 bits wide each, but could actually be selected from any size depending on the implementation constraints. Both memory units 30 and 32 are coupled to a separate pointer pipeline 34a or 34b which supplies two separate designated pointer pairs (Pta and Ptb) from each pointer pipeline which are used to reference entries of the memory units 30 and 32.

Each pointer pipeline provides the address of operands and results for each data memory separately. Pointer pipeline 34a addresses data memory 30 while pointer pipeline 34b supplies pointers to address data memory 32. The memory units are each associated with a separate arithmetic pipeline: memory unit 30 with arithmetic pipeline 38 and memory unit 32 with arithmetic pipeline 40. Each of the memory units have dual read channels and one write channel. Each memory is able to provide two operands to an associated arithmetic pipeline and write a result from the associated arithmetic pipeline or from a memory transfer every cycle. Therefore, each memory has two data output channels and one data input channel. The data input channel for each memory is multiplexed between a system bus 100, a memory bus 110 and the output of an accumulator of an associated arithmetic pipeline.

More specifically, memory unit 30 has two 16 bit read output channels 35, 44 which are fed to two input channels of arithmetic pipeline 38 to supply two operands to the distance arithmetic pipeline 38. Arithmetic pipeline 38 is a pipeline that can perform, among many other functions, the distance computations that were referred to above with reference to the DTW procedure. The output of arithmetic pipeline 38 is fed to the write input of memory 30 via line 55 to supply the memory with the result of the arithmetic pipeline's computation or can be written into the register file. One pointer pipeline 34a is also coupled with memory 30 to supply the two pointers (Pta and Ptb) which are coupled to the read address lines of memory 30 and which address the contents of memory 30 to output operands over the output channels coupled to the arithmetic pipeline 38. Pointer, Pta, is input over line 220 and pointer, Ptb, is input over line 225. The system bus 100 and the memory bus 110 are also coupled to the input write channel of memory 30. A general purpose register file 36 is also coupled to one input of the arithmetic pipeline 38 via line 37 in order to deliver the contents of one of the registers (Regf) to the arithmetic pipeline 38 in the form of an operand. The contents of line 37 and 35 are multiplexed into the corresponding arithmetic pipeline input. The output of the arithmetic pipeline 38 is also input to the general purpose register file 36 via line 55 to supply a register designated as Regd. The memory bus 110 is also communicatively coupled with the general purpose register file 36. It is appreciated that according to the present invention, the memory 30 is uniquely coupled to the arithmetic pipeline 38 that can perform the distance computations. Pointers Pta and Ptb control the accessing of memory 30 to output corresponding values over output channels 35 and 44 to supply arithmetic pipeline 38.

Similarly, with reference to FIG. 4, memory 32 is associated with arithmetic pipeline 40. Arithmetic pipeline 40 of the present invention performs the best path computations as described above for the DTW procedure. The system bus 100, the memory bus 110, and the output of the accumulator of arithmetic pipeline 40 over line 56 are multiplexed into the write input of memory 32. The two read address inputs of memory 32 are coupled to two pointers supplied over lines 53 and 54 from the other pointer pipeline 34b. These pointers are not the same pointers that index memory 30 since each is generated by a pointer pipeline different from that of pointer pipeline 34a. A read channel output 39 is coupled to an input of the arithmetic pipeline 40. The other read channel output 42 is coupled to the other arithmetic pipeline 40 input and multiplexed with an input line 41 that is coupled with the general register file 36. It should be noted that the pointer values associated with both line 220 and 225 are multiplexed to the write address channels of the memories 30 and pointer values 53 and 54 are multiplexed to the write address channels of memory 32.

According to the overall system diagram of the present invention as shown in FIG. 4, there are two arithmetic pipelines, one arithmetic pipeline 38 for computing the distance functions and one arithmetic pipeline 40 for computing the best path. The distance pipeline, or arithmetic pipeline 38, receives operands from the data memory 30 or from the general purpose register file 36 (as Regf) and writes results in the memory 30 or into the general purpose register file into the register identified as Regd. The best path pipeline, arithmetic pipeline 40, receives operands from data memory 32 or the general purpose register file 36 and writes results into memory 32 or into the general purpose register file 36. Although the two arithmetic pipelines work with different memory units, they can exchange data through the common general purpose register file 36. In the currently preferred embodiment, within the register file 36, there are 16 general purpose registers that are 16-bits wide each. Addresses of operands or results to be read out or written into the data memories 30, 32 are provided by the pointer pipelines 34a and 34b respectively. In the currently preferred embodiment, the register file 36 has four ports, two read ports 37 and 41 and two write ports 55 and 56. The register file 36 of the present invention is able to provide one operand to each arithmetic pipeline every cycle and is able to write a result from each arithmetic pipeline operation every cycle.

It is appreciated that each of the two arithmetic pipelines operates in parallel to perform the above computations simultaneously. It is also appreciated that the pointer values supplied by the pointer pipeline 34a and 34b are also updated during the same time as the arithmetic pipelines are performing their calculations. The present invention provides a system whereby in the same instruction cycle that the arithmetic pipelines are calculating their respective results, a pointer pipeline associated with each arithmetic pipeline is preparing the pointer values Pta, Ptb for the next computation (instruction cycle) so that there is no processing delay associated with the pointer update function.

It is appreciated that since the two arithmetic pipelines 38, 40 are identical and also that the two pointer pipelines 34a and 34b are identical, only one set of arithmetic pipeline 38 (the distance pipeline) and associated pointer pipeline 34a will be described in detail herein. It is appreciated that the other set, arithmetic pipeline 40 (the best path pipeline) and pointer pipeline 34b is analogous. It is appreciated that the general purpose register file 36 is common between both of the above sets.

Instruction Formatting of the Present Invention

The present invention utilizes a specialized instruction coding scheme that allows the parallel processing capabilities as described above. This encoding scheme uses a Very Long Instruction Word (VLIW) encoding scheme which is illustrated in Table I below. According to Table 1, long format instructions comprise six separate fields. The first field identifies whether or not the instruction format is long or short. In the currently preferred embodiment, a 1 in this field indicates that the instruction is a long format instruction, while a 0 in the first field identifies a short instruction format. Thus, Table I illustrates a long format. The second field is a 15 bit field that contains control instruction information. The third field, ALU1, contains information for the operation of the distance arithmetic pipeline 38 and the fifth field, ALU2, contains information for the operation of the best path arithmetic pipeline 40. The fourth and sixth fields, PT1 and PT2, contain information that is sent to the two pointer pipelines 34a and 34b, respectively, for pointer update. It is appreciated that the two arithmetic pipelines as well as the two pointer pipelines operate in parallel according to these instruction fields of the Very Long Instruction Word format.

TABLE I

| 1 bit | 15 bits | 27 bits | 5 bits | 27 bits | 5 bits |
|---|---|---|---|---|---|
| 1 | Long Control | ALU1 | Pt1 | ALU2 | Pt2 |

According to Table I, the fourth field corresponds to the instruction field for pointer pipeline 34a. This five bit field controls the pointer pipeline used by the distance arithmetic pipeline 38 of the present invention and contains a pointer instruction or operation. The sixth and last field corresponds to the instruction field for pointer pipeline 34b. This five bit field controls the pointer pipeline used by the best path arithmetic pipeline 40 of the present invention and contains a pointer instruction or operation. It is appreciated that each pointer instruction field also uses the contents of the associated arithmetic pipeline instruction field in order to obtain pointer information.

Table II illustrates in detail the fields available for each 27 bit arithmetic instruction field. Referring to Table II, in the currently preferred embodiment, there are four different instruction formats available for the arithmetic pipeline of the present invention. For the sake of discussion, it is assumed that Table II illustrates the breakdown of the fields associated the distance arithmetic pipeline 38 and pointer pipeline 34a. However, the discussion equally applies to the best path arithmetic pipeline 40 except that each pipeline utilizes a different and associated pointer pipeline. As Table II illustrates, the arithmetic instructions are 4 address instructions. An arithmetic instruction specifies addresses of two pointer registers and addresses of two general purpose registers. Which registers are used as sources or source addresses and which registers are used as destination or destination addresses is specified in a 5 bit field called the type, or, more specifically, source type and destination type. The operation performed between the sources is called the opcode. The accumulator may also be a source and it is appreciated that the accumulator always holds the result of the previous arithmetic instruction.

TABLE II

| 6 bits | 1 bit | 4 bits | 4 bits | 4 bits | 4 bits | 4 bits |
|---|---|---|---|---|---|---|
| Opcode | Destination type | Source Type | Ptb | Pta | Regf | Regd |
| Opcode | 1 (*Ptb) | 0×11 *Pta op Imm | Ptb | Pta | 8 bit immediate | |
| Opcode | 0 (Regd) | 1111 Regf op Imm | 8 bit immediate | Regf | Regd | |
| nop or Idimm | 0 (Regd) | | 16-bit immediate | | | Regd |

The above Table II illustrates that the arithmetic pipeline operation of the present invention may adopt one of four different formats. The first format will be discussed in detail herein. According to the first format, the first six bits of the instruction represent the opcode or operation for the particular instruction cycle. A listing of the available operations that may be performed by each arithmetic pipeline of the present invention is presented herein at the Appendix. Note that in the Appendix, the opcode of the operation which generates the absolute value of a difference is 1B Hex. The ALU opcode is typically an arithmetic operation to be performed by the arithmetic pipeline. The next bit indicates where the destination will be for the result of the operation. This destination may be the designated register, Regd, of the general purpose register file 36 or may be an address within the data memory 30 as pointed to by the designated pointer, Ptb. The next four bits indicate the source type of the present instruction which indicates from where the sources of the opcode will be taken. This will be described in detail to follow. The next four bits (the fourth field) indicate which pointer of the 16 pointers of the pointer file associated with arithmetic pipeline 38 will be designated as pointer Ptb. The next four bits (the fifth field) indicate which pointer of the 16 pointers of the pointer file associated with arithmetic pipeline 38 will be designated as pointer Pta. The following four bits indicate which register of the 16 registers of the general purpose register file 36 will be designated as Regf. The following four bits indicate which register of the 16 registers of the general purpose register file 36 will be designated as Regd.

It is appreciated that this first format of the arithmetic instruction contains four addresses of four different sources. Depending on the status of the source type field, these four addresses may be utilized in order to gather the operands for the designated opcode or to route the result of the opcode to a proper destination. It is appreciated that since pointer pipeline 34a operates in parallel with arithmetic pipeline 38 and may designate pointers for a pointer instruction, up to four separate addresses may be utilized and updated within a single instruction. This format allows a large degree of flexibility for the instructions of the arithmetic pipelines of the present invention. According to the second format illustrated in Table II, an 8 bit immediate value can be placed into the last 8 bits of the arithmetic instruction format. In this format, the destination address must be designated as *Ptb which is the address within the memory 30 pointed to by Ptb. In the third format, the 8 bit immediate value is placed in the 8 bits that are usually reserved for the pointer indicators. In this format, the result is predetermined for the register, Regd. Lastly, the fourth format allows for a 16 bit immediate value to be introduced into the arithmetic pipeline. It is appreciated that the type field indicates the addressing mode for the operands and results of the operation specified within the opcode field. Therefore, four addressing modes are provided for the operands: 1) immediate operand mode; 2) register operand mode; 3) pointer indirect mode; and 4) pointer indirect with register offset mode. Register mode and pointer indirect mode are the only two possible addressing modes for results of arithmetic instructions.

Table III illustrates how destination and sources of the arithmetic pipeline are selected depending on the destination and source type fields.

TABLE III

| Destination Type (1 bit) | Source 1 Type (2 bits) | Source 2 Type (2 bits) |
|---|---|---|
| 0 Regd | 00 *Pta (byte) | 00 *Ptb (byte) |
| 1 *Ptb | 01 *Pta (word) | 01 *Ptb (word) |
| | 10 *(Pta + Regf) | 10 Accumulator |
| | 11 Regf | 11 Immediate |

According to Table III, when the destination field of the arithmetic instruction format is 0, the result of the arithmetic pipeline will be loaded from the accumulator into the register indicated as Regd. Otherwise, the result will be loaded into the memory 30 at a location indicated by pointer, Ptb. The first two bits of the source type refer to the first source location for the arithmetic pipeline 38. If the first two bits of the source type are 00 then the first source will be indirectly addressed from pointer, Pta, from the memory 30 in a 8 bit format. If the first two bits of the source type are 01 then the first source will be indirectly addressed from pointer, Pta, from the memory 30 in a 16 bit word format. If the first two bits of the source type are 10 then the first source will be indirectly addressed from pointer, Pta, and offset by the value of Regf from the memory 30 in a 16 bit word format. If the first two bits of the source type are 11 then the first source will be taken as the value within Regf, a direct access, in a 16 bit word format.

Referring still to Table III, the second two bits of the source field indicate the location of the second source of the arithmetic pipeline 38. If the second two bits are 00 then the second source will be obtained via indirect addressing according to the value of pointer, Ptb, and the memory 30 will deliver a byte format. If the second two bits are 01 then the second source will be obtained via indirect addressing according to the value of pointer, Ptb, and the memory 30 will deliver a word format. If the second two bits of the source type field are 10 then the second source will come from the accumulator of the arithmetic pipeline 38. If the second two bits of the source type are 11 then the second source of the arithmetic pipeline will come from the immediate value found in the arithmetic instruction format of Table II. Table III illustrates that the present invention arithmetic pipeline offers a rich addressing scheme of four possible operand addresses for each arithmetic instruction opcode.

Distance Arithmetic Pipeline 38 of the Present Invention

Given the addressing schemes of the present invention as described above and the instruction formats, a discussion of the hardware components that realize elements of the present invention will now be discussed. With reference now to FIG. 5, there is illustrated a more detailed diagram of the distance arithmetic pipeline 38 (dashed lines) that performs the distance calculations of the DTW procedure. The best path arithmetic pipeline 40 is identical to this pipeline. FIG. 5 also illustrates in more detail the general purpose register file 36 and the associated data memory 30 that are used with the arithmetic pipeline 38. It is appreciated that with reference to the arithmetic pipeline 40, it will exchange information with memory 32 which is addressed by pointer pipeline 34a but will address the general purpose register file which is common to both arithmetic pipelines.

Data memory 30 is shown in FIG. 5. The write data port 30b of memory 30 is coupled to a register (latch) 91 which receives data input from a multiplexer 93 over three sources. It receives input from the system bus 100, from a memory bus 110 or from the output of the arithmetic pipeline 38. The single write address port 30a of memory 30 receives an input from register (latch) 83 which receives an input from multiplexer 80. Addresses from the memory bus 110 or from the designated pointer, Ptb, can be multiplexed into the latch 83. The pointer, Ptb, originates from the pointer pipeline 34a. The first read address port 30c of the memory 30 is coupled to a register (latch) 84 which receives its input from multiplexer 82. Multiplexer 82 receives address inputs from designated pointer, Ptb, and from the memory bus 110. The second read address port 30d receives input from a register (latch) 85 which receives one input. The input is the designated pointer, Pta. The first read address port is associated with the first read data output port 35 and the second read address port is associated with the second read data output port 44 of the memory 30. It is noted that an output from channel 44 is also fed to the memory bus 110.

The two read data output channels 35 and 44 supply two operands to the arithmetic pipeline 38. The read data output channel 35 of the present invention is a sixteen bit line and is fed into a eight bit multiplexer (not shown here) and then fed into a sign extension block 61 of the arithmetic pipeline 38. Similarly, the read data output channel 44 is a sixteen bit line and is fed into a eight bit multiplexer (not shown here) and fed into a sign extension block 62 of the arithmetic pipeline 38. The sign extension logic blocks 61 and 62 are coupled to an input line of each multiplexer 64 and 66 respectively. Each sixteen bit data channel 35 and 44 is also directly coupled to the inputs of multiplexers 64 and 66 respectively. Also coupled to an input of multiplexer 64 and 66 is the accumulator 74. The output of the register file 36 is also fed into an input of multiplexer 64 via line 37 and a bypass circuit; this carries the designated Regf value. Coupled to the input of multiplexer 66 is line 86 which carries an immediate value. Multiplexer 64 is selected via the first two bits of the source type field and multiplexer 66 is selected via the last two bits of the source type field associated with arithmetic pipeline 38. Multiplexer 64 therefore selects the location for the first source which is loaded into register (latch) 68 while multiplexer 66 selects the location for the second source which is loaded into register (latch) 69. The reason the accumulator is fed into the first source, even though no accumulator location is allowed according to Table III, is because when a designated Regf is a register that was previously the value of the accumulator in the just previous instruction, the present invention will input the accumulator value as Regf instead of accessing the register file 36. This is an implementation choice selected by the present invention for efficiency and is transparent to a programmer of the arithmetic pipeline 38.

The arithmetic pipeline 38 of FIG. 5 of the present invention for the distance arithmetic pipeline contains four operators within a logical operator unit 70. Although the present invention may operate using a variety of operators, the preferred embodiment of the present invention includes a barrel shifter 70a, and adder and subtractor 70b, an ALU (arithmetic/logic) unit 70c which may also perform subtraction operations, and a pass operator 70d which is a multiplexing element between the first and second sources. Each of the above four operators are coupled to both sources 68 and 69 to receive the two operands. Each of the operators are also coupled to a multiplexer 72 which channels the results to an accumulator. Depending on the operation selected, the multiplexer 72 channels the proper result to the accumulator latch 74. All of the arithmetic operations are done with 16 bit operands and results. The accumulator is also fed via line 55 to a bypass circuit into multiplexer 66 and to a bypass circuit that may substitute for Regf, however, these features are not pertinent to the present invention. Further, the accumulator output is fed into one input of multiplexer 76 along with the memory bus 110 and the system bus 100. None of these other inputs aside from the accumulator are pertinent to the present invention. The output of the multiplexer 76 is then fed via line 90 to the 16 bit general register file 36 into the register designated as Regd by the arithmetic instruction format shown in Table II.

According to the diagram of FIG. 5, the present invention arithmetic pipeline 38 may have two possible source locations; one operand may come from the general purpose register file and an operand may come from the data memory 30 accessed by a pointer from the pointer pipeline 34a. Also, there are two possible destinations for a particular arithmetic instruction format; one possible destination may be to store the result into the register file 36 or to store the result into the data memory 30. Multiplexers 64, 66, 72, 76 and 93 are used to perform the specific routing to realize the source and destination types indicated by the instruction formats of Table II of the present invention.

Referring now to FIG. 6, the present invention arithmetic pipeline is disclosed in more detail. The memory unit 30 of the present invention is divided into 256 entries of 16 bits each entry and each entry is also divided into two bytes. Therefore, there are 512 byte entries within the memory 30, the same is true for memory 32. Table III allows both byte and word accesses from the memory 30 via the pointers *Pta and *Ptb (indirect accessing used here). Depending on the source type, the arithmetic pipeline will process the output of the memory 30 as word data or as byte data. It is appreciated that each of the read address ports 30d and 30c of the memory 30 input an eight bit address value in order to access the memory. This is the case because the output channels 34 and 44 are sixteen bits long and there are 256 entries. However, for byte accessing there must be another bit added so that an individual byte within an accessed word can be selected. This ninth bit is the least significant bit of the address value, is supplied by the pointer values, Pta and Ptb, and is separated from the address that enters port 30d and port 30c. The LSB bit from pointer, Pta, is carried via line 165 to a high/low selector input of multiplexer 101. The LSB bit from pointer, Ptb, is carried via line 166 to a high/low selector input of multiplexer 102. The manner in which the present invention utilizes these bits will be developed in discussions to follow further below. It is appreciated that all reference to pointers Pta and Ptb refer to the pointers that originate from the pointer pipeline 34a.

Since Table III only allows pointer Ptb or Regd to be a destination address, the write address into port 30a of memory 30 is Ptb from the pointer pipeline 34a. Data for the write channel 30b, as discussed before, may originate from the accumulator via line 55 or may come from another system component over the system bus 100 or memory bus 110. The first read address channel 30d originates from multiplexer 124 which is controlled by select line 150. Select line 150 carries the first two bits of the source type of the arithmetic pipeline 38 instruction format of Table III. If line 150 selects '00' or '01' then the multiplexer allows the pointer data of Pta to pass to port 30d. If the select line 150 selects '10' then the multiplexer 124 will couple the line 120 to channel 30d. Line 120 is output from a logical adder 122 that adds the values of the designated Regf to the value of the pointer, Pta and outputs the result over line 120. In all cases the pointer value, Ptb, is fed to the input of read address channel 30c during DTW processing of the present invention. Also Ptb and Pta are fed to channels 30a and 30d, respectively, during DTW processing.

The data read output channel 35 is 16 bits wide and will carry the high and low bytes of the word address by the signal at line 30d. This line 35 is separated into a high byte line having 8 bits and a low byte line having 8 bits and each of these are fed into a multiplexer 101. Multiplexer 101 will select either the high byte line or the low byte line of the addressed word depending on the value of line 165 which is the ninth and least significant bit of the designated pointer, Pta, or the summation of Pta and Regf. If line 165 is low, the low byte is selected and if line 165 is high then the high byte is selected and routed to the sign or zero extension block 61. Line 155 originates from the instruction opcode field of Table II. This field will indicate if sign extension is required by the nature of the opcode. If sign extension is required then the selected byte from line 35 and the multiplexer 101 will be placed into a 16 bit register in the least significant byte position and the most significant byte of the 16 bit register will be all set to "1" by block 61 of the present invention if the sign bit of the selected byte is a "1." However, the most significant byte of the 16 bit register will be all set to "0" by block 61 if the sign bit of the selected byte is a "0." This block 61 can transform a signed byte (8-bits) into a signed word (16-bits) if the opcode of the current arithmetic instruction indicates that a sign operation is required.

The 16 bit register result of the sign/zero extension block 61 is fed into one input of a multiplexer 64. The 16 bit data read channel 35 is also fed into an input of multiplexer 64. Lastly, the value of the designated register, Regf, is fed into an input of multiplexer 64. Multiplexer 64 is selected according to line 150. If line 150 selects '00' then the output of block 61 is channeled into the first source register 68. If line 150 selects '01' or '10' the multiplexer 64 selects the read data channel 35 to be coupled to the first source register 68. Lastly, if line 150 selects '11' then line 37 is coupled to the first source register 68.

Referring still to FIG. 6, the second read data channel 44 outputs a 16 bit value which is separated into two 8 bit lines, a high byte and a low byte and each of these are fed into a multiplexer 102. Multiplexer 102 will select either the high byte or the low byte of the addressed word depending on the value of line 166 which is the ninth and least significant bit of the designated pointer, Ptb. If line 166 is low, the low byte is selected and if line 166 is high then the high byte is selected and routed to the second sign or zero extension block 62. The sign or zero extension block 61 is selected by line 155. Line 155 originates from the instruction opcode field of Table II. This field will indicate if sign extension is required by the nature of the opcode. If sign extension is required, then the selected byte from line 44 and the multiplexer 102 will be placed into a 16 bit register within block 62 in the least significant byte position and the most significant byte of the 16 bit register will be all set to "1" by block 62 of the present invention if the sign bit of the selected byte is a "1." However, the most significant byte of the 16 bit register will be all set to "0" by block 62 if the sign bit of the selected byte is a "0." This block 62 can transform a signed byte (8-bits) into a signed word (16-bits) if the opcode of the current arithmetic instruction indicates that a sign operation is in order. The 16 bit register of block 62 is then output to an input of multiplexer 66.

Referring to FIG. 6, multiplexer 66 receives an input from block 62. It also receives an input directly from channel line 44. It receives an input from the accumulator of arithmetic pipeline 38 over line 55. Lastly, multiplexer 66 receives an input from line 86 which is the immediate data value of the arithmetic instruction format. All of the inputs to multiplexer 66 are 16 bit in length. Line 152 is fed as the select line for multiplexer 66 and represents the last two bits of the select type of Table III. If line 152 selects '00' then the input from the block 62 coupled to the second source register 69. If line 152 selects '01' then line 44 is coupled to register 69. If line 152 selects '10' then line 55 is coupled to the register 69 to bring the accumulator value to the second source and if line 152 selects '11' then line 86 is coupled to place the immediate value into register 69. The output of the first source register 68 and the second source register are fed to the operator unit 70 which contains the barrel shifter operator, the adder/subtractor operator, the ALU operator, and the pass operator. The multiplexed result of the operator unit 70 is then routed into an accumulator register 74 which is coupled to line 55 and also fed into a multiplexer 76 which supplies the result to the register file 36 as designated register, Regd. The system bus is also coupled to the multiplexer 76.

The destination type bit of the arithmetic instruction format of Table III effects the placement of the result of the arithmetic pipeline 38. When the destination is selected as the designated register Regd (i.e., the bit is 0) then the write enable 173 of the general purpose register file 36 allows the arithmetic pipeline result to be stored into the addressed Regd. When the destination type is selected for the indirect addressing pointer, *Ptb, (i.e., bit is 1) then the write enable is asserted onto memory 30 which is addressed by pointer Ptb via port 30a and the result is supplied via line 55 and the multiplexer 93. It is noted that multiplexer 93 selects line 55 or line 100 (with reference to FIG. 5) as an input during DTW point processing.

It is appreciated that a common multiplier unit (not shown) exists and is common to both the distance and best path arithmetic pipelines and may perform multiplier functions within arithmetic instructions on selected source operands while multiplexing the result within the appropriate accumulator.

Therefore, according to the above discussions the present invention arithmetic pipeline realizes in circuitry the addressing modes illustrated in Table I, Table II, and Table III. It is appreciated that all of the discussions with regard to FIG. 5 and FIG. 6 apply analogously to identical arithmetic pipeline 40. However, pointers Pta and Ptb originate from pointer pipeline 34b for the arithmetic pipeline 40 and the memory unit associated with arithmetic pipeline 40 is memory 32. Further, while the distance arithmetic pipeline 38 utilizes the first arithmetic instruction field (27 bits) of Table I, the best path arithmetic pipeline 40 utilizes the second arithmetic instruction field (27 bits) of Table I.

Pointer Pipeline 35a of the Present Invention

FIG. 7 is a logical block diagram and illustrates the elements of one embodiment of the present invention in more detail concerning the interface of the arithmetic pipelines and the pointer pipelines. The two arithmetic pipelines 38 and 40 are illustrated coupled to memory units 30 and 32 respectively and also coupled to the general purpose register file 36. Pointer pipeline 34b is illustrated coupled to memory unit 32. The distance pointer pipeline 34a is illustrated in more detail. Within the pipeline architecture 34a is located a pointer register file 200 that contains 8 registers that are 16 bits wide each. This register file is coupled to a pointer operator 205 which is a logical unit that can perform operations on the pointers, Pta and Ptb. The designated pointers, Pta and Ptb are output over lines 220 and 225, respectively, which are coupled to memory 30 and also coupled to the pointer operator 205. The result of the pointer operator is fed back into the pointer register 200. Also, Regf is supplied to the pointer register file 200 via line 37 from the register file 36.

Given this overall system diagram, it is appreciated that the architecture and instruction coding for pointer pipeline 34b is identical to the pointer pipeline 34a (except pipeline 34a addresses memory 30 while pipeline 34b addresses memory 32) and therefore is not described in detail as to avoid obscuring the present invention. It is appreciated that the pointer pipeline 34b contains its own pointer register file and does not utilize the register file 200 of pointer pipeline 34a. Since each arithmetic pipeline has a corresponding pointer pipeline counterpart, during the processing cycle wherein an arithmetic pipeline is performing a point computation, the associated pointer pipeline will be updating the pointer information so that upon the immediate next processing cycle the arithmetic pipeline may process the next valid point of the lattice without a pointer update delay.

In so doing the processing required to update the pointers takes no additional processing time. The present invention therefore offers an extremely efficient and rapid processing scheme that may be especially useful in pattern recognition procedures. It is appreciated that the arithmetic pipeline 38 may operate utilizing one address or two addresses as a source for source1, one address as a source for source2, one address as a destination while the pointer pipeline 34a may simultaneously operate on another, fourth address to perform pointer updating functions. Therefore, within one instruction the present invention allows simultaneous processing of four addresses and two arithmetic functions, one function being computed by the arithmetic pipeline and the other being computed by the pointer pipeline.

Logical Operational Flow of the Present Invention

Figure 8:
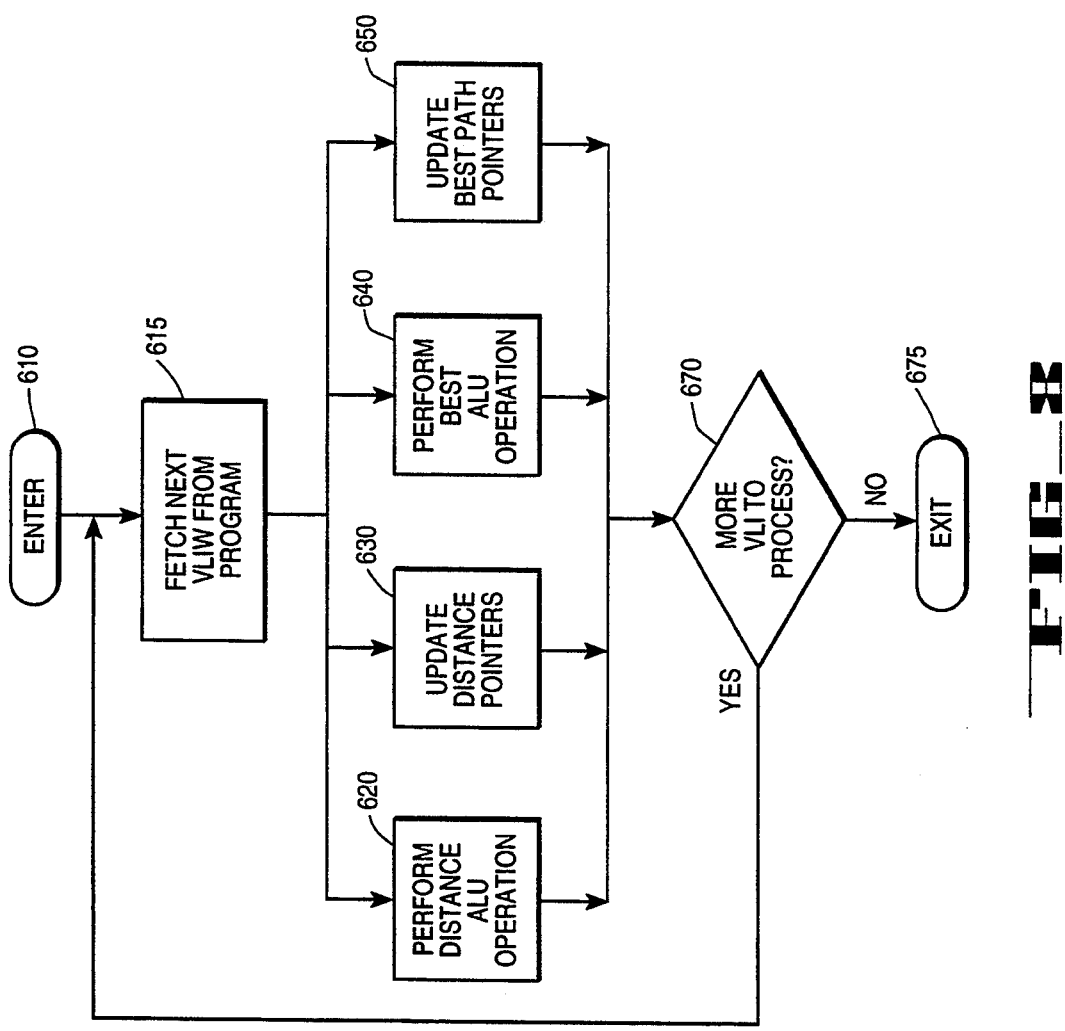
FIG. 8 is an overall flow diagram of the parallel processing states of the arithmetic pipelines and the pointer pipelines of the present invention.

FIG. 8 illustrates the overall operational logic flow of the arithmetic pipelines and the pointer pipelines of the present invention. It is appreciated that since the instructions of the present invention are pipelined, stages of sequential VLIW instructions will begin executing before some of the prior instructions have completed. This is the case because different stages of different VLIW instructions may be executed simultaneously using well known pipeline techniques. The following flows illustrate the logical operations of each VLIW instruction as if executed separately, but in reality, it should be borne in mind the pipeline execution techniques of the present invention allow different stages (that are not interdependent) of sequential instructions to be executed simultaneously.

For a given instruction clock cycle, the flow of FIG. 8 begins at block 610 where the processing is entered from the overall system 525 and the next Very Long Instruction Word is fetched from a program code memory at block 615. This VLIW contains operations for the four pipelines of FIG. 4. Each of the four pipelines operates in parallel to decode and execute the instruction of block 615 during a single instruction clock cycle. Therefore, for N number of instruction clock cycles, the processes of each of the four pipelines will execute N times.

At block 620, the arithmetic distance pipeline decodes the first arithmetic instruction field and performs any required distance calculations associated with the current pattern point in the DTW processing. In other words, the Manhattan distance is expected at this point. At the same time, at block 630, the first pointer pipeline 34a associated with the distance arithmetic pipeline performs the designated instructions held within the first pointer field of the VLIW. At the same time, at block 640 the best path arithmetic pipeline performs any best path computations as indicated within the second ALU field of the VLIW. And, at the same instant block 650 performs the second pipeline 34b operations of the second pipeline instruction field that is associated with the best path arithmetic pipeline 40. After the above four pipelines begin execution, each flows into block 670 where the pattern recognition code is checked in order to inquire if there are further VLIW to process. If not, then at block 675 this flow is exited. If there are more instructions then the processing returns to block 615 to fetch another VLIW for the next clock cycle. It is appreciated that the present invention, via parallelism of the above four DTW tailored pipelines, offers tremendous efficiency and power for pattern recognition applications.

FIG. 9 illustrates in more detail the flow of each arithmetic pipeline. For illustration, the flow of block 620, the distance pipeline 38, is illustrated in detail. At block 900 the processing is entered and at block 905 the four address arithmetic instruction field associated with the arithmetic pipeline 38 is retrieved from Table I. Processing then continues simultaneously to perform a variety of status checks. At block 910 the source2 field of the arithmetic instruction (of Table II) is examined and if equal to '00' block 915 is executed where the pointer, Ptb, is utilized to indirectly address a word from the memory 30 via the second read port. Line 166 will determine which byte, either high or low, of this word is selected for zero or sign extension via block 920. After processing, the original byte data will be transformed by the present invention into a word format and sign or zero extended and placed into the source2 register 69 by block 950. If the test at block 910 fails then processing for this test is over. In parallel, the source2 field is also checked by the present invention at block 925 and if equal to '01' then the pointer, Ptb, is used to indirectly address memory 30 to obtain an entire word of data. This word is then directly loaded into the source2 register 69 at block 950. If the test at block 925 fails then processing for this test is over. At block 930 the source2 field is checked and if equal to '10' then block 935 places the result of the arithmetic pipeline 38 accumulator into the source2 register 69 at block 950. If the test at block 930 fails then processing of the present invention for this test is over. At block 940 the source2 field is checked and if equal to '11' then the data held in the immediate field of the instruction is read by block 945 and placed into the source2 register at block 950. If the test at block 940 fails then processing for this test is over. The above processing blocks 910, 925, 930, and 940 are performed in parallel and are accomplished in order to access the proper source for the source2 register 69.

Referring still to FIG. 9, while the above source2 branch is processing, the present invention also performs processing to determine the source of the source1 register 68. Block 975 of the present invention checks if the source1 field of the first arithmetic instruction (of Table II) is equal to '00' and if so will access the memory 30 via the first read port to obtain a word of data. A byte of this word is selected via line 165 (high or low byte) at block 977 and this selected byte is sent to a zero or sign extension operator via block 979. The byte data is then transformed into word format and supplied to the source1 register 68 at block 952. If the test at block 975 fails then the processing for this test ends. At block 980 of the present invention, the source1 field is examined and if equal to '01' the memory 30 will be indirectly accessed via pointer, Pta, by the first read port to obtain a word of data. This word is then directly placed into the source1 register 68 at block 952. If the test at block 980 fails then the processing for this test ends. Processing at block 985 determines whether source1 field is equal to '10' and if so the value of pointer, Pta, is obtained as well as the Regf value from file 36. These two values are added together via adder 122 and the result is used as an address to access memory 30 over the first read port to obtain a word of data. This word is then placed into the source1 register via block 952. If the test at block 985 fails then the processing for this test ends. Processing of the present invention at block 995 compares the source1 field to '11' and if equal will read the value of Regf register from file 36 at block 997 and place this word into the source1 register 68 at block 952. If the test at block 995 fails then the processing for this test ends. By the above processing, the present invention performs blocks 975, 980, 985 and 995 in parallel during a single instruction cycle to arrive at the proper source location for the source1 register 68.

At block 957, the present invention performs the operation specified by the ALU opcode within the arithmetic instruction field on the two operands stored by block 950 and block 952. One or more of the operator units: the barrel shifter 70a, the adder/subtractor 70b, the ALU operator 70c; and the pass operator 70d will be involved in the determination and input these word operands from the source1 and source2 registers.

When the instruction is the Manhattan distance instruction, an opcode of 1B Hex causes two of the operator units to be involved, namely the adder/subtractor 70b and the ALU operator 70c. The loaded sources 68 and 69 supply the values of the two operands to the adder/subtractor 70b and the ALU 70c which subtract the operands from one another to produce a result representing the difference between the two numbers. Note that in the currently preferred embodiment, the adder/subtractor 70b performs a subtraction operation between the two operands at the same time ALU operator 70c performs a subtraction operation between the two operands in reverse order. That is, if the adder/subtractor 70b subtracts the source1 operand from the source2 operand, then the ALU operator 70b subtracts the source2 operand from the source1 operand. The results of both calculations are fed to multiplexer 72.

Multiplexer 72 receives the results from adder/substractor 70b and ALU operator 70c and selects one of the two results as the actual absolute value of the difference between the source1 and source2 operands. Multiplexer 72 contains control circuitry which determines when a Manhattan distance instruction is being executed (i.e., by analyzing the ALU opcode). Multiplexer 72 also contains the control circuitry to determine which of results from the adder/subtractor 70b and ALU operator 70c is positive. In the currently preferred embodiment, multiplexer 72 identifies which of the results is positive by examining the sign bit of one of the results. If the sign bit is a 0, thereby indicating that it is positive, then that result is selected as the output of multiplexer 72. However, if the sign it is a 1, then multiplexer 72 selects the other of the two results. Multiplexer 72 operates in a manner well-known in the art. Thus, multiplexer 72 outputs the correct result (i.e., the result which represents the absolute value of a difference) and channels that result to accumulator 74.

Note that in the present invention, the absolute value of a difference is determined within a single instruction cycle. In other words, the subtraction operations and selection of the positive result associated with the execution of the Manhattan distance instruction are all performed within one clock cycle. By generating the absolute value of a difference within one cycle, the present invention allows the DTW processing to be performed much faster than the prior art machines.

Also note that in the currently preferred embodiment, the Manhattan distance operation is performed twice in consecutive operations in each iteration of the DTW processing. Note that in other embodiments, multiple execution pipelines may be utilized to perform all of the Manhattan distance operations associated with one point. Note that in the currently preferred embodiment, one arithmetic pipeline performs the absolute value of difference calculations, while the other arithmetic pipeline accumulates all of the absolute value calculation results produced by the other arithmetic pipeline to obtain a final distance.

Once the operation has been completed, if the status of the result field of the arithmetic instruction (Table II) as examined by block 960 is equal to '1' then the word result of the operator unit 70 will be placed into the memory location pointed to by pointer, Pta via block 962. If the destination field is '0' then the result of the operation of block 957 will be placed into the designated register Regd. In either case, after the result of the operation is stored the arithmetic pipeline processing of the present invention is complete for the current instruction. At block 970 the next four address arithmetic instruction is prepared and then fetched at block 905 where the entire process continues for a new instruction. It is appreciated that the arithmetic instruction allows four different addresses.

It is appreciated that the present invention arithmetic pipeline and pointer pipeline combination allows simultaneous execution, within one instruction, of two operations, one operation on pointer addresses (pointer pipeline) and one operation on data addresses (arithmetic pipeline) thus allowing one instruction to access four addresses.

Whereas many alterations and modifications of the present invention will no doubt become apparent to a person of ordinary skill in the art after having read the foregoing description, it is to be understood that the particular embodiment shown and described by way of illustration is in no way intended to be considered limiting. Therefore, references to details of the preferred embodiment are not intended to limit the scope of the claims which in themselves recite only those features regarded as essential to the invention.

Thus, a method and apparatus for generating the Manhattan distance has been described.

APPENDIX

| Opcode | Operation | Name | Flags |
|---|---|---|---|
| 0H | Nop | No operation | |
| 1H | Src1 -Byte- Zero-Ext | First Operand (unsigned byte) | |
| 2H | Src1 -Byte- Sign-Ext | First Operand (signed byte) | |
| 3H | Src1 | First Operand (word) | |
| 4H | Src2-Byte-Zero-Ext | Second Operand (unsigned byte) | |
| 5H | Src2-Byte-Sign-Ext | Second Operand (signed byte) | |
| 6H | Src2 | Second Operand (word) | |
| 7H | Src1 + Src2 | Add | N, Z, C, O |
| 8H | addu Src1 +Src2 | Unsigned Add | Z, C |
| 9H | Src1 +Src2 + CIN | Add with Carry | N, Z, C, O |
| AH | Src1 − Src2 | Sub | N, Z, C, O |
| BH | subu Src1 − Src2 | Unsigned Sub | N, Z, C, O |
| CH | Src2 − Src1 | Reverse Sub | N, Z, C, O |
| DH | subu Src2 −Src1 | Unsigned Reverse Sub | Z, C |
| EH | Src1 − Src2 − CIN | Sub with Carry | N, Z, C, O |
| FH | Src2 − Src1 CIN | Reverse Sub with Carry | N, Z, C, O |
| 10H | Src1 & Scr2 | Logical And | Z |
| 11H | Src1 \| Src2 | Logical Or | Z |
| 12H | ~Src1 | Logical Not First Operand | Z |
| 13H | ~Src2 | Logical Not Second Operand | Z |
| 14H | Src1 ∧ Src2 | Logical Xor | Z |
| 15H | ~(Src1 & Src2) | Logical Nand | Z |
| 16H | Rd = 16 bit immediate | Load Immediate | |
| 17H | Min (Src1, Src2) | Minimum | MM |
| 18H | UMin (Scr1, Src2) | Unsigned Minimum | MM |
| 19H | Max (Src1, Src2) | Maximum | MM |
| 1AH | UMax (Src1, Src2) | Unsigned Maximum | MM |
| 1BH | \|Src1 − Src2\| | Absolute Value of Difference | N=0, Z, C=0, O |
| 1CH | Src1 >> Src2 | Right Shift | N=0, Z, C |
| 1DH | Src1 << Src2 | Left Shift | N, Z, C |
| 1EH | Src1 Arith >> Src2 | Arithmetic Right Shift | N, Z, C |
| 1FH | Src1 Right Rot Src2 | Right Rotate | N, Z |
| 20H | Src1 Left Rot Src2 | Left Rotate | N, Z |
| 21H | Src1? Src2 | Compare | N, Z, C=0, O=0 |
| 22H | UComp Src1?Scr2 | Unsigned Compare | N, Z, C=0, O=0 |
| 23H | imull Src1 * Src2 | Integer multiply (lower half) | N, Z, C, O |
| 24H | imulh Src1 * Src2 | Integer multiply (upper half) | N, Z, C=0, O=0 |
| 25H | umull Src1 * Src2 | Unsigned multiply (lower half) | Z, C |
| 26H | umulh Src1 * Src2 | Unsigned multiply (upper half) | Z, C=0 |
| 27H | TstSt | Test and Set | |
| 28H | rpr | Read Pointer Register | |
| 29H | rcr | Read Control Register | |
| 2AH | rsr | Read Special Register | |
| 2BH | wsr | Write Special Register | |
| 2CH | Ext Byte Ld - Zero Extend | External byte Load Zero Extend | |
| 2DH | Ext Byte Ld - Sign Extend | External Byte load Sign Extend | |
| 2EH | Ext Byte St | External Byte Store | |
| 2FH | Ext Word Ld | External Word Load | |
| 30H | Ext Word St | External Word Store | |
| 31H | itp | Interrupt | |

-continued

APPENDIX

| Opcode | Operation | Name | Flags |
|--------|-----------|------|-------|
| 32H–3FH | Reserved | | |

I claim:

1. An apparatus for performing pattern recognition comprising:

a memory storage area to store operands for execution;

a first arithmetic logic pipeline coupled to the memory storage area for performing distance calculations between points of an unknown pattern and a reference pattern; and a second arithmetic logic pipeline coupled to the memory storage area for performing best path calculations between said points of said unknown pattern and said reference pattern, said second arithmetic logic pipeline executing in parallel with said first arithmetic logic pipeline;

a first pointer pipeline associated with the first arithmetic pipeline for preparing pointer values for accessing memory to supply operand to the first arithmetic logic pipeline;

a second pointer pipeline associated with the second arithmetic pipeline for preparing pointer values for accessing memory to supply operands to the second arithmetic logic pipeline wherein the first pointer pipeline and the second pointer pipeline operate in parallel with said first arithmetic pipeline and said second arithmetic pipeline; and wherein first arithmetic logic pipeline includes means for executing instructions to calculate distance between a first point in the unknown pattern and a second point in the reference pattern, the means for executing including:

means for providing a first operand specified within a first instruction during a first instruction cycle and a third operand specified within a second instruction during a second instruction cycle immediately following the first instruction cycle;

means for providing a second operand specified within said first instruction during a first instruction cycle and a fourth operand specified within the second arithmetic instruction during the second instruction cycle;

first means coupled to receive the first operand and the second operand in the first instruction cycle for subtracting the first operand from the second operand to generate a first result during the first instruction cycle, wherein the first means is also coupled to receive the third operand and the fourth operand in the second instruction cycle for subtracting the third operand from the fourth operand to generate a third result during the second instruction cycle;

second means coupled to receive the first operand and the second operand in the first instruction cycle for subtracting the second operand from the first operand to generate a second result during the first instruction cycle, wherein the second means is also coupled to receive the third operand and the fourth operand in the second instruction cycle for subtracting the fourth operand from the third operand to generate a fourth result during the second instruction cycle; and a multiplexer coupled to receive the first result and the second result during the first instruction cycle to select the positive of either the first result or the second result during the first instruction cycle, such that the absolute value of the difference between the first operand and the second operand is produced in the first instruction cycle, and wherein the multiplexer is also coupled to receive the third result and the fourth result during the second instruction cycle to select the positive of either the third result or the fourth result during the second instruction cycle, such that the absolute value of the difference between the third operand and the fourth operand is produced in the second instruction cycle, wherein the first pointer pipeline and the second pointer pipeline prepare pointer values during the first instruction cycle to allow the third operand and the fourth operand to be available at the second instruction cycle to the means for executing, wherein the first arithmetic pipeline calculates distance between the first point in the unknown pattern and the second point in the reference pattern in consecutive cycles.

2. The apparatus as defined in claim 1 wherein the first means for subtracting and the second means for subtracting operate at the same time.

3. The apparatus as defined in claim 1 wherein the first pointer pipeline and the second pointer pipeline update pointer values during the first instruction cycle based on information specified in the first instruction.

4. The apparatus defined in claim 1 wherein the memory storage area comprises a first memory coupled to the first arithmetic pipeline, a second memory coupled to the second arithmetic pipeline, and a register file coupled to the first arithmetic pipeline and the second arithmetic pipeline.

5. The apparatus defined in claim 4 wherein the first pointer pipeline provides pointer values to access the first memory and the register file and the second pointer pipeline provides pointer values to access the second memory and the register file.

6. The apparatus defined in claim 1 further comprising a decoder coupled to the first arithmetic pipeline, the second arithmetic pipeline, the first pointer pipeline and the second pointer pipeline to decode the first instruction and the second instruction for execution by the first arithmetic pipeline, the second arithmetic pipeline, the first pointer pipeline and the second pointer pipeline.

7. An apparatus for performing pattern recognition comprising:

a memory storage area to store operands for execution;

a first arithmetic logic pipeline coupled to the memory storage area for performing distance calculations between points of an unknown pattern and a reference pattern; and a second arithmetic logic pipeline coupled to the memory storage area for performing best path calculations between said points of said unknown pattern and said reference pattern, said second arithmetic logic pipeline executing in parallel with said first arithmetic logic pipeline;

a first pointer pipeline associated with the first arithmetic pipeline for preparing pointer values for accessing memory to supply operands to the first arithmetic logic pipeline;

a second pointer pipeline associated with the second arithmetic pipeline for preparing pointer values for accessing memory to supply operands to the second arithmetic logic pipeline, wherein the first pointer pipeline and the second pointer pipeline operate in parallel with said first arithmetic pipeline and said second arithmetic pipeline; and wherein first arithmetic logic pipeline includes means for executing instructions to calculate distance between a first point in the unknown pattern and a second point in the reference pattern, the means for executing including:

means for providing a first operand specified within a first instruction during a first instruction cycle and a third operand specified within a second instruction during a second instruction cycle immediately following the first instruction cycle;

means for providing a second operand specified within said first instruction during a first instruction cycle and a fourth operand specified within the second arithmetic instruction during the second instruction cycle;

a first arithmetic logic unit coupled to receive the first operand and the second operand in the first instruction cycle to subtract the first operand from the second operand to generate a first result during the first instruction cycle, wherein the first arithmetic logic unit is also coupled to receive the third operand and the fourth operand in the second instruction cycle to subtract the third operand from the fourth operand to generate a third result during the second instruction cycle;

a second arithmetic logic unit coupled to receive the first operand and the second operand in the first instruction cycle to subtract the second operand from the first operand to generate a second result during the first instruction cycle, wherein the second arithmetic logic unit is also coupled to receive the third operand and the fourth operand in the second instruction cycle to subtract the fourth operand from the third operand to generate a fourth result during the second instruction cycle; and a multiplexer coupled to receive the first result and the second result during the first instruction cycle to select the positive of either the first result or the second result during the first instruction cycle, such that the absolute value of the difference between the first operand and the second operand is produced in the first instruction cycle, and wherein the multiplexer is also coupled to receive the third result and the fourth result during the second instruction cycle to select the positive of either the third result or the fourth result during the second instruction cycle, such that the absolute value of the difference between the third operand and the fourth operand is produced in the second instruction cycle, wherein the first pointer pipeline and the second pointer pipeline prepare pointer values during the first instruction cycle to allow the third operand and the fourth operand to be available at the second instruction cycle to the means for executing, wherein the first arithmetic pipeline calculates distance between the first point in the unknown pattern and the second point in the reference pattern in two consecutive cycles without a pointer update delay.

8. The apparatus defined in claim 7 wherein the first pointer pipeline and the second pointer pipeline update pointer values during the first instruction cycle based on information specified in the first instruction.

9. The apparatus defined in claim 7 wherein the memory storage area comprises a first memory coupled to the first arithmetic pipeline, a second memory coupled to the second arithmetic pipeline, and a register file coupled to the first arithmetic pipeline and the second arithmetic pipeline.

10. The apparatus defined in claim 9 wherein the first pointer pipeline provides pointer values to access the first memory and the register file and the second pointer pipeline provides pointer values to access the second memory and the register file.

11. The apparatus defined in claim 7 further comprising a decoder coupled to the first arithmetic pipeline, the second arithmetic pipeline, the first pointer pipeline and the second pointer pipeline to decode the first instruction and the second instruction for execution by the first arithmetic pipeline, the second arithmetic pipeline, the first pointer pipeline and the second pointer pipeline.

12. A system performing pattern recognition comprising:

a bus to provide a communication pathway between system components;

a central processor coupled to said bus; and a pattern recognition mechanism coupled to said bus, wherein said pattern recognition mechanism further comprises a memory storage area to store operands for execution;

a first arithmetic logic pipeline coupled to the memory storage area for performing distance calculations between points of an unknown pattern and a reference pattern; and a second arithmetic logic pipeline coupled to the memory storage area for performing best path calculations between said points of said unknown pattern and said reference pattern, said second arithmetic logic pipeline executing in parallel with said first arithmetic logic pipeline;

a first pointer pipeline associated with the first arithmetic pipeline for preparing pointer values for accessing memory to supply operands to the first arithmetic logic pipeline;

a second pointer pipeline associated with the second arithmetic pipeline for preparing pointer values for accessing memory to supply operands to the second arithmetic logic pipeline, wherein the first pointer pipeline and the second pointer pipeline operate in parallel with said first arithmetic pipeline and said second arithmetic pipeline; and wherein first arithmetic logic pipeline includes means for executing instructions to calculate distance between a first point in the unknown pattern and a second point in the reference pattern, the means for executing including:

means for providing a first operand specified within a first instruction during a first instruction cycle and a third operand specified within a second instruction during a second instruction cycle immediately following the first instruction cycle;

means for providing a second operand specified within said first instruction during a first instruction cycle and a fourth operand specified within the second arithmetic instruction during the second instruction cycle;

first means coupled to receive the first operand and the second operand in the first instruction cycle for subtracting the first operand from the second operand to generate a first result during the first instruction cycle, wherein the first means is also coupled to receive the third operand and the fourth operand in the second instruction cycle for subtracting the third operand from the fourth operand to generate a third result during the second instruction cycle;

second means coupled to receive the first operand and the second operand in the first instruction cycle for subtracting the second operand from the first operand to generate a second result during the first instruction cycle, wherein the second means is also coupled to receive the third operand and the fourth operand in the second instruction cycle for subtracting the fourth operand from the third operand to generate a fourth result during the second instruction cycle; and a multiplexer coupled to receive the first result and the second result during the first instruction cycle to select the positive of either the first result or the second result during the first instruction cycle, such that the absolute value of the difference between the first operand and the second operand is produced in the first instruction cycle, and wherein the multiplexer is also coupled to receive the third result and the fourth result during the second instruction cycle to select the positive of either the third result or the fourth result during the second instruction cycle, such that the absolute value of the difference between the third operand and the fourth operand is produced in the second instruction cycle, wherein the first pointer pipeline and the second pointer pipeline prepare pointer values during the first instruction cycle to allow the third operand and the fourth operand to be available at the second instruction cycle to the means for executing, wherein the first arithmetic pipeline calculates distance between the first point in the unknown pattern and the second point in the reference pattern in consecutive cycles.

* * * * *

UNITED STATES PATENT AND TRADEMARK OFFICE
CERTIFICATE OF CORRECTION

PATENT NO. : 5,384,722
DATED : January 24, 1995
INVENTOR(S) : Dulong It is certified that error appears in the above-identified patent and that said Letters Patent is hereby corrected as shown below:

On the title page, in the inventor's name in Section [75], substitute --Carole Dulong-- for "Carol Dulong".

In column 5, at line 4, delete "are is" and substitute --axis are--.

Signed and Sealed this

Fifth Day of November, 1996

Attest:

BRUCE LEHMAN

*Attesting Officer*      *Commissioner of Patents and Trademarks*